United States Patent
Williams

(10) Patent No.: US 11,480,225 B2
(45) Date of Patent: Oct. 25, 2022

(54) BRAKE ASSEMBLY

(71) Applicant: Meritor Heavy Vehicle Braking Systems (UK) Limited, Gwent (GB)

(72) Inventor: Anthony Williams, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 245 days.

(21) Appl. No.: 16/365,049

(22) Filed: Mar. 26, 2019

(65) Prior Publication Data

US 2019/0301549 A1 Oct. 3, 2019

(30) Foreign Application Priority Data

Mar. 28, 2018 (EP) .................................. 18164497

(51) Int. Cl.
 *F16D 65/00* (2006.01)
 *F16D 55/40* (2006.01)
 *B60T 13/58* (2006.01)
 *F16D 55/00* (2006.01)
 *F16D 61/00* (2006.01)
 *F16D 121/04* (2012.01)

(52) U.S. Cl.
 CPC ......... *F16D 65/0043* (2013.01); *F16D 55/40* (2013.01); *B60T 13/581* (2013.01); *F16D 61/00* (2013.01); *F16D 2055/0091* (2013.01); *F16D 2121/04* (2013.01); *F16D 2250/0084* (2013.01)

(58) Field of Classification Search
 CPC ................. F16D 65/0043; F16D 55/40; F16D 2055/0091; F16D 61/00; F16D 2121/04; F16D 2250/0084; F16D 65/14; F16D 2121/02; F16D 2121/08; B60T 13/581; B23P 15/00
 See application file for complete search history.

(56) References Cited

U.S. PATENT DOCUMENTS 2,888,101 A * 5/1959 Bayles .................... F16D 55/40
 188/71.5
4,207,968 A * 6/1980 Chamberlain .......... B60T 1/062
 188/71.4

(Continued)

FOREIGN PATENT DOCUMENTS

| CN | 106402205 A | 2/2017 |
|----|-------------|--------|
| FR | 2022171 A6 | 7/1970 |

(Continued)

OTHER PUBLICATIONS

Meritor Heavy Vehicle Systems, LLC, Mentor's European Braking Solutions, Run with the Bull, © 2018 Meritor, Inc., SP-18118, Issued Sep. 2018, Italy, 8 pages.

(Continued)

*Primary Examiner* — Ryan J. Walters
(74) *Attorney, Agent, or Firm* — Brooks Kushman PC

(57) ABSTRACT

A method of making a brake assembly. The method may include providing a brake pad carrier, an air operated brake actuator suitable for attaching to the brake pad carrier, and a hydraulically operated brake actuator suitable for attaching to the brake pad carrier, and attaching one of the air operated brake actuator and hydraulically operated brake actuator to the brake pad carrier to provide a brake assembly.

5 Claims, 8 Drawing Sheets

(56) References Cited

U.S. PATENT DOCUMENTS

| | | | | |
|---|---|---|---|---|
| 6,196,359 | B1* | 3/2001 | Daudi | B60T 8/00 |
| | | | | 188/106 P |
| 6,338,705 | B1* | 1/2002 | Cavallo | B23P 23/02 |
| | | | | 29/26 A |
| 6,354,407 | B1 | 3/2002 | Heinlein et al. | |
| 6,491,141 | B1* | 12/2002 | Severinsson | B60T 17/083 |
| | | | | 188/170 |
| 8,936,138 | B2* | 1/2015 | Morris | F16D 55/226 |
| | | | | 188/73.1 |
| 9,920,800 | B2* | 3/2018 | Philpott | F16D 65/0075 |
| 2011/0054758 | A1* | 3/2011 | Bae | F16D 66/00 |
| | | | | 701/92 |
| 2012/0312642 | A1* | 12/2012 | Bosco, Jr. | F16D 65/0006 |
| | | | | 188/72.3 |
| 2016/0167628 | A1* | 6/2016 | Thomas | F16D 55/22 |
| | | | | 29/428 |
| 2017/0082160 | A1* | 3/2017 | Philpott | F16D 65/0075 |

FOREIGN PATENT DOCUMENTS

| | | |
|---|---|---|
| GB | 818689 A | 8/1959 |
| WO | 2012041321 A1 | 4/2012 |

OTHER PUBLICATIONS

European Patent Office, Extended European Search Report for corresponding European Application No. 18164497.2-1012, dated Dec. 21, 2018.

* cited by examiner

BRAKE ASSEMBLY

TECHNICAL FIELD

The present invention relates to a method of making a brake assembly, in particular a method of making a service brake assembly which service brake assembly may be used on a vehicle such as a lorry, truck or bus.

BACKGROUND

Vehicles include park brakes which are used to hold the vehicle stationary when parked, and also include service brakes which are used to slow or stop the vehicle whilst it is being driven.

Heavy vehicles such as lorries, trucks, and buses have traditionally used air operated service brake assemblies, such as shown in U.S. Pat. No. 6,354,407.

SUMMARY

According to one aspect of the present invention, there is provided a method of making a service brake assembly including the steps of: a) providing a brake pad carrier, b) providing an air operated brake actuator suitable for attaching to the brake pad carrier, c) providing a hydraulically operated brake actuator suitable for attaching to the brake pad carrier, and d) attaching one of the air operated brake actuator and hydraulically operated brake actuator to the brake pad carrier to provide a service brake assembly.

According to a further aspect of the present invention, there is provided a method of making a first service brake assembly and second service brake assembly including the steps of: a) providing a first bare casting, b) providing a second bare casting the same as the first bare casting, c) machining the first bare casting in a first manner to provide a first brake pad carrier, d) attaching an air operated brake actuator to the first brake pad carrier to provide the first service brake assembly, e) machining the second bare casting in a second manner to provide a second brake pad carrier and f) attaching a hydraulically operated brake actuator to the second brake pad carrier to provide the second service brake assembly.

According to a further aspect of the present invention, there is provided a method of reworking an air operated brake actuator assembly, the air operated brake assembly including an air operated brake actuator attached to a brake pad carrier, the re-working step including replacing the air operated brake actuator with a hydraulically operated brake actuator by removing the air operated brake actuator from the brake pad carrier and attaching a hydraulically operated brake actuator to the brake pad carrier to provide a solely hydraulically operated service brake.

According to a further aspect, the present invention may include a lorry, truck, bus or other heavy vehicle having a regenerative braking system and including a hydraulically operated brake assembly manufactured by the method associated with any of the three preceding paragraphs.

BRIEF DESCRIPTION OF THE DRAWINGS

The invention will now be described, by way of example only, with reference to the accompanying drawings in which.

DETAILED DESCRIPTION

Figure 1:
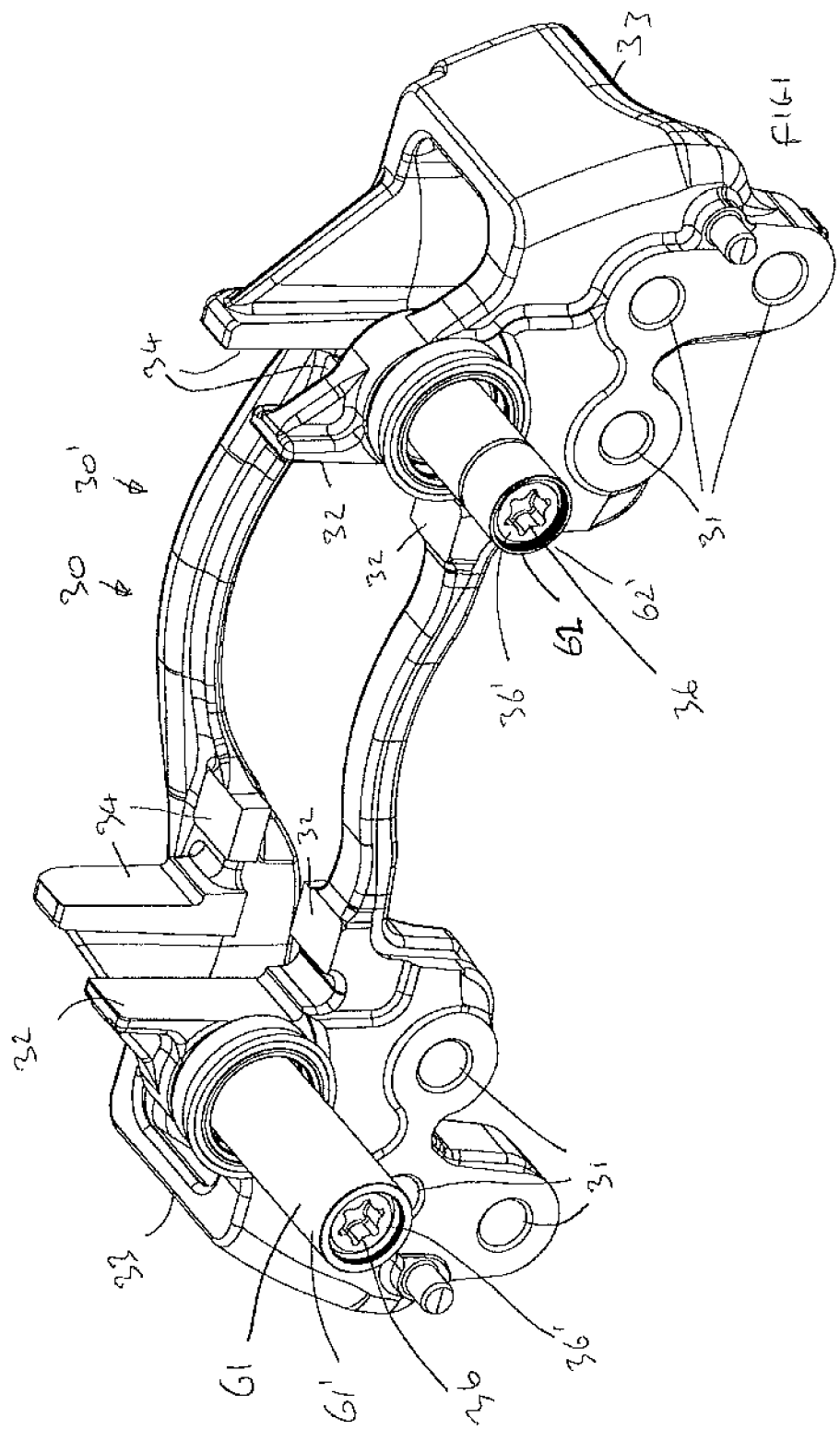
FIG. 1 is an isometric view of a brake pad carrier according to the present invention.
Figure 2:
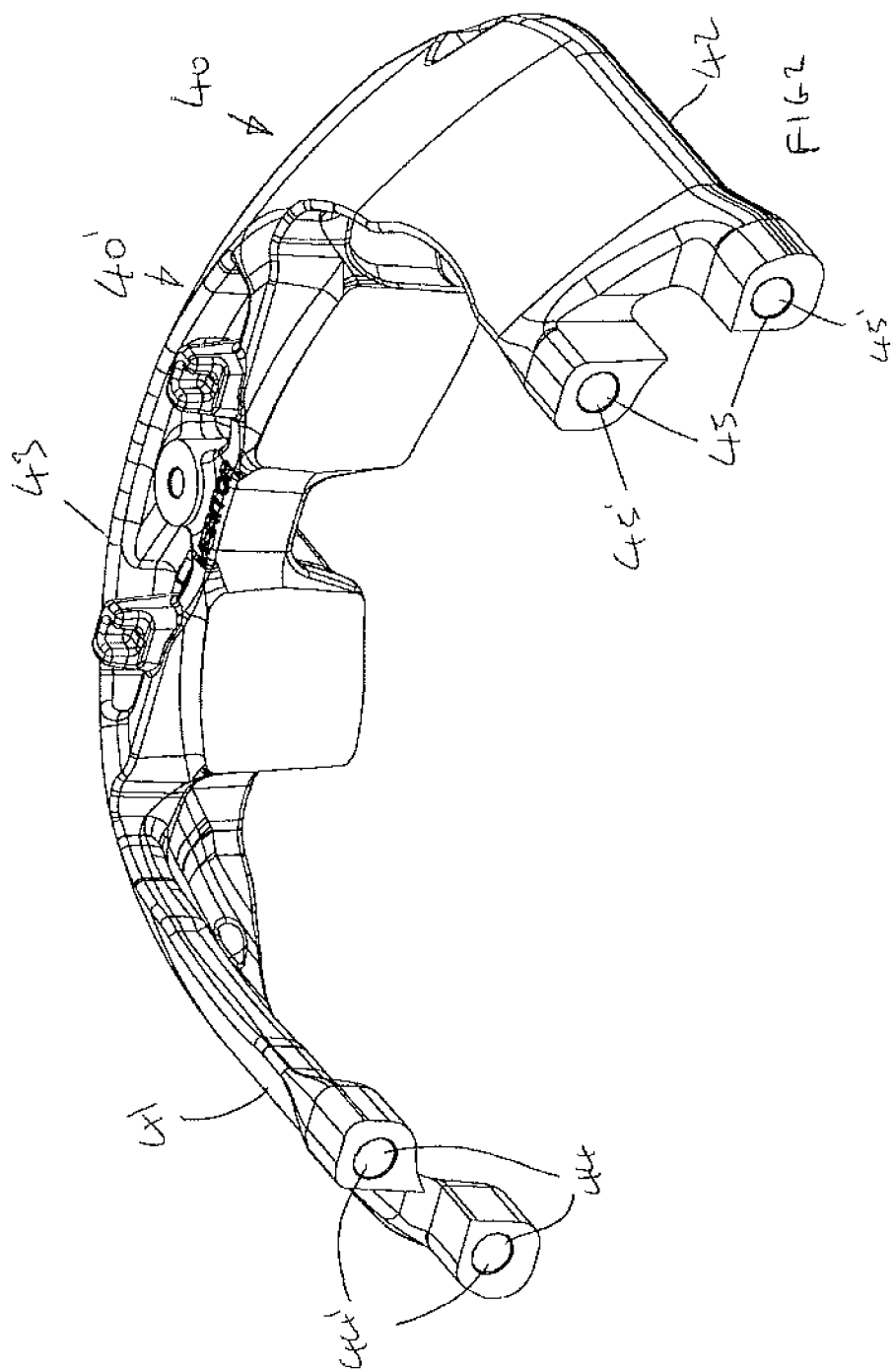
FIG. 2 is an isometric view of a brake bridge according to the present invention.
Figure 3:
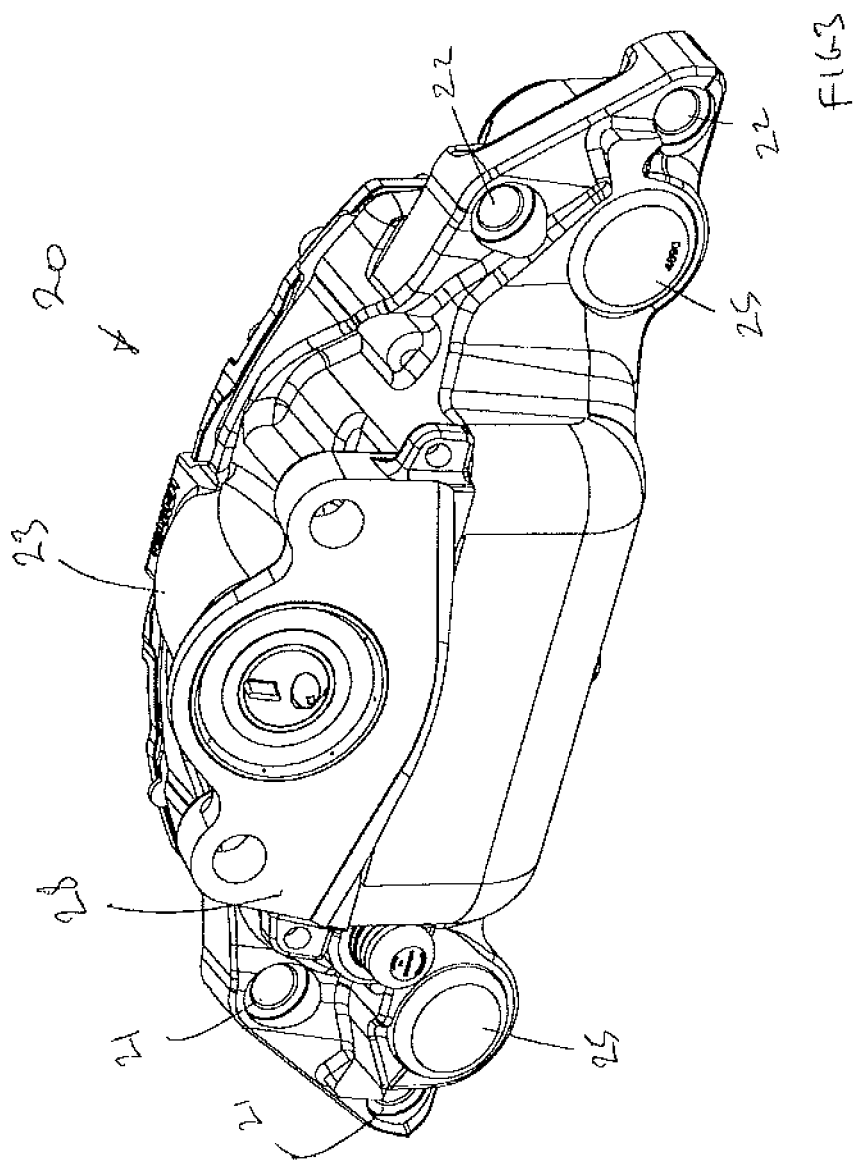
FIG. 3 is an isometric view of an air operated brake actuator and housing according to the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 8 there is shown an air operated brake assembly 10 in particular an air operated service brake assembly. The air operated service brake assembly 10 is solely air operated. The air operated service brake assembly is not hydraulically operated. With reference to FIGS. 1 to 8 there is also shown a hydraulically operated brake assembly 12, in particular a hydraulically operated service brake assembly. The hydraulically operated service brake assembly 12 is solely hydraulically operated. The hydraulically operated service brake assembly is not air operated.

The main components of the air operated brake assembly are an air operated actuator 20, a brake carrier 30, a bridge 40 and slide pins 61 and 62. The air operated actuator 20 is solely air operated. The air operated actuator 20 is not hydraulically operated.

The major components of the hydraulically operated brake assembly are a hydraulically operated actuator 50, a brake carrier 30', a bridge 40' and slide pins 61' and 62'. Brake carrier 30 is the same as brake carrier 30', bridge 40 is the same as bridge 40', slide pin 61 is the same as slide pin 61' and slide pin 62 is the same as slide pin 62'. As such FIGS. 1 and 2 have been labelled accordingly. The hydraulically operated actuator 50 is solely hydraulically operated. The hydraulically operated actuator 50 is not air operated.

Brake carrier 30 includes attachment holes 31, inboard pad abutments 32, arms 33 and outboard pad abutments 34. The brake carrier 30 also includes slide pin holes (not shown, but which will be further described below).

The bridge 40 includes a body 43, a first arm 41 extends from a first end of the body and a second arm 42 extends from a second end of the body. The first arm includes attachment holes 44 and the second arm 42 includes attachment holes 45.

The air operated actuator 20 (shown schematically in FIG. 8) is housed within housing 23. The housing includes first attachment holes 21 and second attachment holes 22. The housing also includes slide pin holes 25. The housing includes a recess 26 in which is housed the air operated actuator 20. The air operated actuator is a set of mechanical components well known in the art, for example see U.S. Pat. No. 6,354,407.

However, in summary an air actuator chamber (not shown) is attached to flange 28 of the housing and operates by selective introduction of pressurized air into/out of the chamber to cause a piston of the air operated actuator to selectively move in the direction of arrow A when it is required to apply the brake and in the direction of arrow B when it is required to release the brake.

The hydraulically operated actuator 50 includes a body 53. The body has first attachment holes 51 and second attachment holes 52. The body also includes slide pin holes 55. The body 53 includes a recess 56. The recess is at least defined by a first piston bore 56A and a second piston bore 56B. The first piston bore and second piston bore are both hydraulically linked to hydraulic port 58. A first piston 59A is slideably received in the first piston bore 56A and a second piston 59B is slideably received in the second piston bore 56B.

Assembly of the air operated brake assembly 10 is as follows.

The air operated actuator 20 is assembled into the recess 26 and secured to the housing 23 via any suitable method (not shown) e.g., bolts.

The slide pins 61, 62 are positioned adjacent their respective slide pin holes and bolts 36 are threaded in to the slide pin holes to secure the pins to the carrier 30.

The housing 23 is attached to the brake carrier 30 by inserting the slide pins 61 and 62 into the slide pin holes 25 of housing 23. The housing is therefore slideably received on the slide pin 61 and 62 which in turn are securely attached to the brake carrier 30.

The bridge 40 is then attached via bolts 63 passing through the first attachment holes 21 and being screwed into the threaded attachment holes 44 on the bridge 40. In a similar manner bolts 64 are passed through the second attachment holes 22 of the housing 23 and are threaded into threaded attachment holes 45 of the bridge 40. As will be appreciated, such an arrangement provides for an air operated brake assembly wherein the air operated actuator 20 and bridge 40 are slideably attached to the brake carrier 30.

Assembly of the hydraulically operated brake assembly is as follows.

The pistons 59A and 59B are assembled into the appropriate first and second piston bores 56A and 56B together with any necessary piston seals and dust seals.

The slide pins 61', 62' are attached at the slide pin holes of carrier 30' via bolts 36' in a manner as described above with respect to slide pins 61, 62 and carrier 30.

The body 53 is attached to the brake carrier 30' by inserting the slide pins 61' and 62' into the slide pin holes 25' of body 53. The body 53 is therefore slideably received on the slide pins 61' and 62' which in turn are securely attached to the brake carrier 30'.

The bridge 40' is then attached via bolts 63' passing through the first attachment holes 51 and being screwed into the threaded attachment holes 44' on the bridge 40'. In a similar manner bolt 64' are passed through the second attachment holes 52 of the housing 23 and are threaded into threaded attachment holes 45' of the bridge 40'. As will be appreciated, such an arrangement provides for a hydraulically operated brake assembly wherein the hydraulically operated actuator 50 and bridge 40' are slideably attached to the brake carrier 30'.

Operation of a hydraulically operated brake is well known in the art, but in summary in order to apply the brake pressurized hydraulic fluid is supplied to port 58 which causes the pistons 59A and 59B to advance towards the brake disc thereby applying brake. When it is required to release the brake, hydraulic pressure is released at port 58 thereby allowing the seals and the like to retract the pistons 59A and 59B which in turn releases the brake.

As will be appreciated, the invention enables the manufacture of an air actuated brake (which is only air operated) and a hydraulically actuated brake (which is only hydraulically operated) using major components which are the same. This allows for economies of scale. Firstly, in respect of the brake components themselves, and secondly in respect of the axles the brakes are fitted to.

As described above, the brake carrier, bridge, and both slide pins are the same on the air operated brake assembly 10, and the hydraulically operated brake assembly 12. A further component which may be the same are bolts 63 and 63', bolts 64 and 64', bolts 36 and 36', brake pad straps 70 and 70', the brake pads used with the air operated brake assembly 10 and the hydraulically operated brake assembly 12, and also the disc used with the air operated brake assembly 10 and the hydraulically operated brake assembly 12. As such, significant economies of scale can be used when manufacturing air operated brake assemblies and hydraulically operated brake assemblies according to the present invention.

As described above, the brake carrier 30 is the same as the brake carrier 30'. Brake carrier 30 and 30' may be made from a casting. The casting used to make brake carrier 30 and brake carrier 30' may be a common casting. Thus, under certain situations, for example different installations, it may be necessary to make the brake carrier 30 of the air operated brake assembly slightly different from the brake carrier 30' of the hydraulically operated bake assembly. Thus, the brake carrier 30, when made from a common casting, may require minor machining differences to a brake carrier 30' made from the common casting. As such, a further aspect of the present invention provides for economies of scale in respect of manufacturing a common casting that can be machined in a first manner to provide an air operated brake assembly and may be machined in a second manner to provide a hydraulically operated brake assembly.

Similarly, the bridge 40 and 40' may be made from a casting. Under certain circumstances, for example for particular installations, it may be necessary to machine the bridge 40 in a slightly different manner to machining of the bridge 40'. Nevertheless, the bridge 40 and 40' may be made from a common casting with the bridge 40 being machined in the first manner to provide the air operated brake assembly and with the bridge 40' being operated in a second manner to provide the hydraulically operated brake assembly.

Air operated brake assemblies (which are only operated by air and not hydraulically operated) are typically used on heavy vehicles such as lorries, trucks, buses etc. Hydraulically operated brakes (which are only hydraulically operated and not air operated) are typically used on lighter vehicles such as passenger cars. This is because the ability to absorb heat energy of a hydraulically operated system is typically less than the ability to absorb heat on an air operated system. It is for this reason that air operated braking systems have been fitted to heavy vehicles such as lorries, trucks and buses etc. since braking systems of such heavy vehicles need to dissipate significant amounts of heat.

With the advent of regenerative braking systems (i.e., braking systems which convert the kinetic energy of the moving vehicle into a re-usable form of energy (such as electrical energy within a battery of the vehicle or kinetic energy within a flywheel of the vehicle), then because the brakes of such vehicles no longer are required to dissipate such large amounts of energy as heat, it becomes possible to use hydraulically operated brakes on vehicle which have traditionally used air operated brakes. The present invention allows brake manufacturers to supply both air operated brakes and hydraulically operated brakes to manufacturers of heavy vehicles in a cost-efficient manner.

When vehicles are serviced and it is necessary to repair a brake assembly, the person servicing the vehicle will often exchange the old (used) brake assembly for a previously repaired (refurbished) brake assembly. In this way the person repairing the vehicle is able to quickly repair the vehicle and hence return the vehicle to service quickly.

Similarly, the person supplying a repaired (refurbished) brake assembly (the brake repairer) will receive the old (used) brake assembly in exchange. This can then be repaired and subsequently exchanged for another old (used) brake assembly when another vehicle requires a repaired (refurbished) brake assembly. As such a particular brake assembly may be removed from one vehicle, subsequently repaired, and then subsequently fitted to a second vehicle. With the advent of heavy vehicles using regenerative braking, then it can be expected that progressively more vehicles in the "vehicle park" (i.e., vehicles which are in use) might have hydraulically operated brakes, and progressively fewer vehicles might have air operated brake assemblies. As such, because the present invention uses components on an air operated brake assembly and on a hydraulically operated brake assembly that are common to both, then a brake repairer can easily rework one type of brake assembly e.g., an air operated brake assembly to provide a different type of brake assembly e.g., a hydraulically operated brake assembly which hydraulically operated brake assembly may be used with a heavy vehicle having a regenerative braking system.

Figure 4:
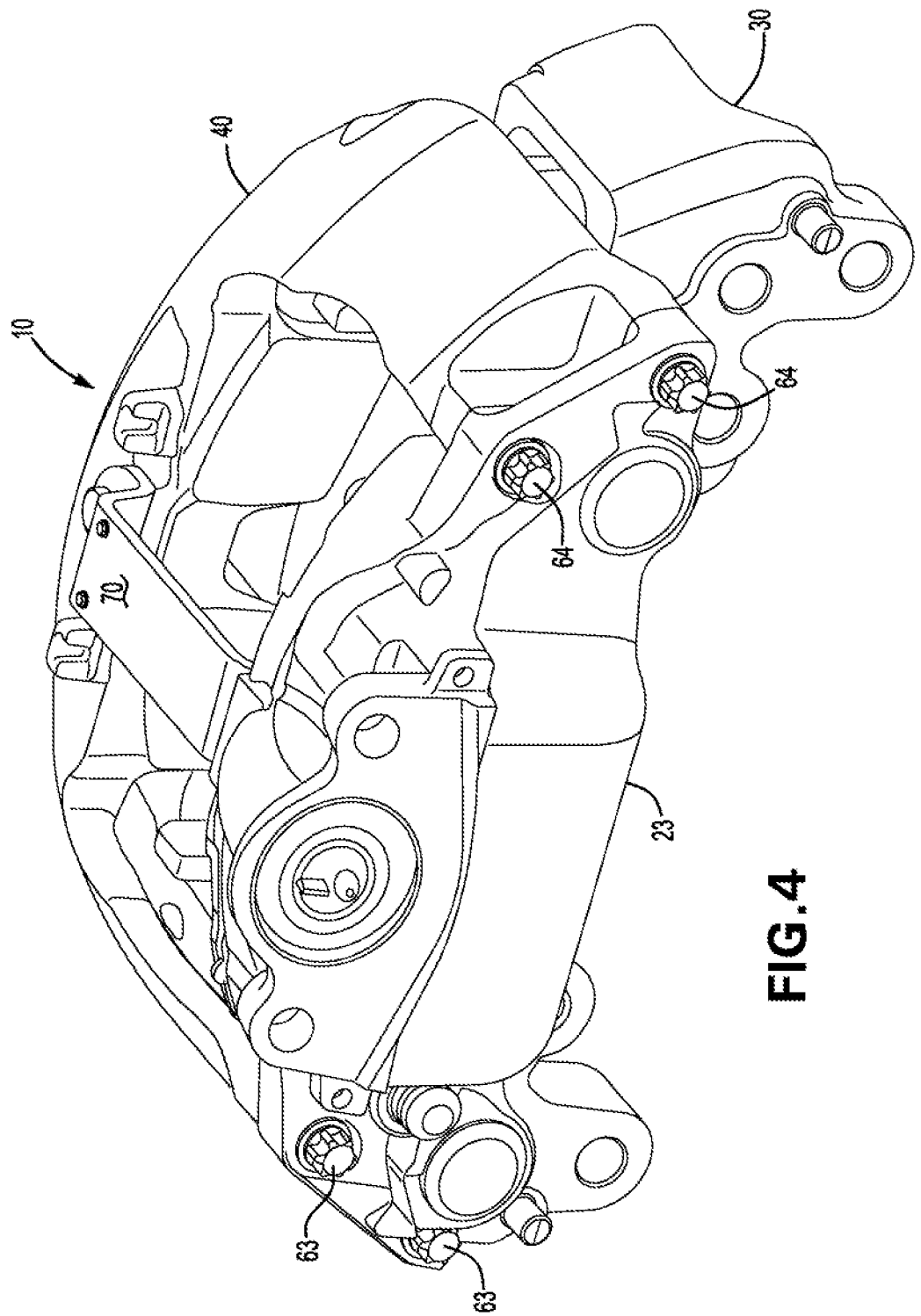
FIG. 4 is an isometric view of an air operated brake assembly according to the present invention.
Figure 5:
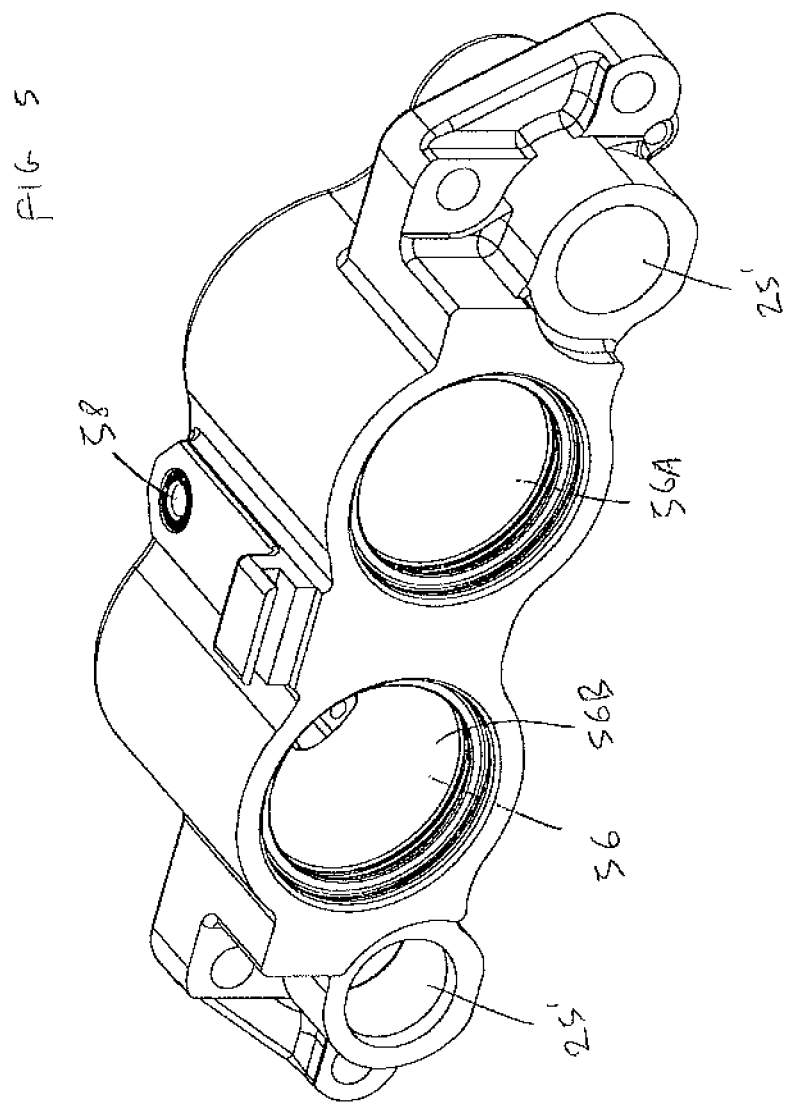
FIG. 5 is an isometric view of part of a hydraulically operated actuator according to the present invention.
Figure 6:
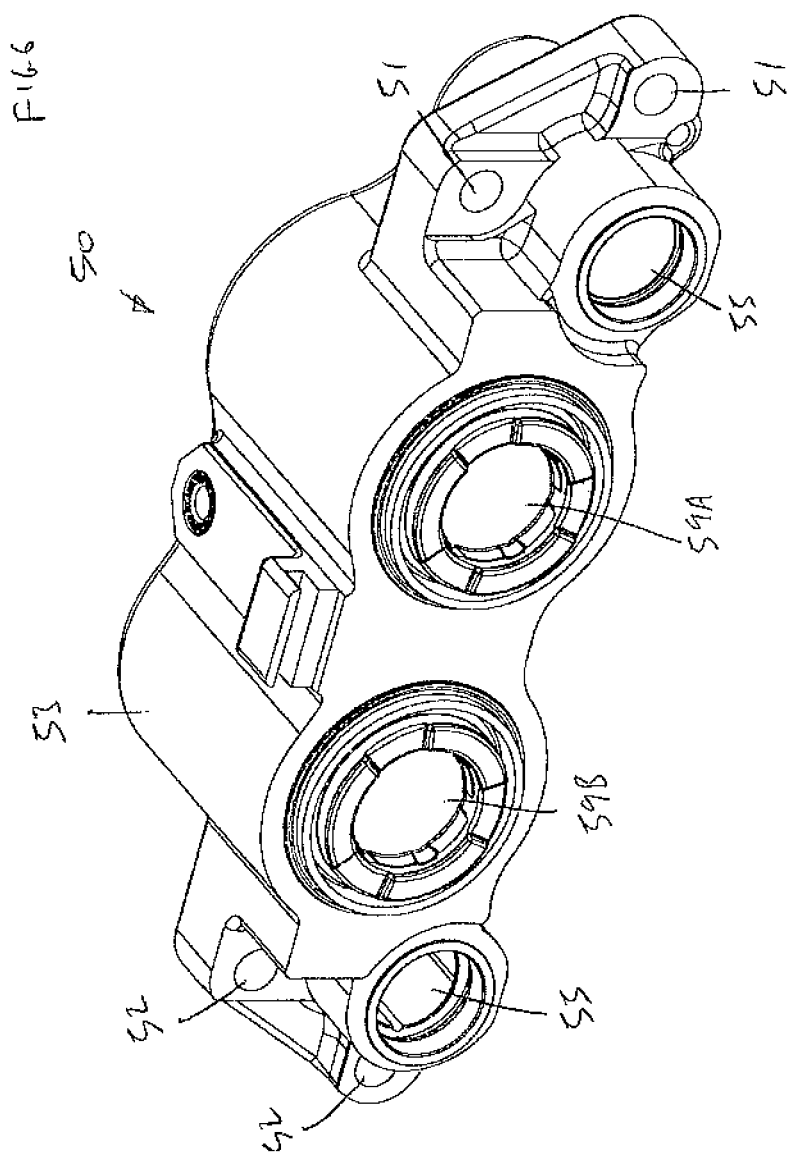
FIG. 6 is a view similar to FIG. 5 further including further components.
Figure 7:
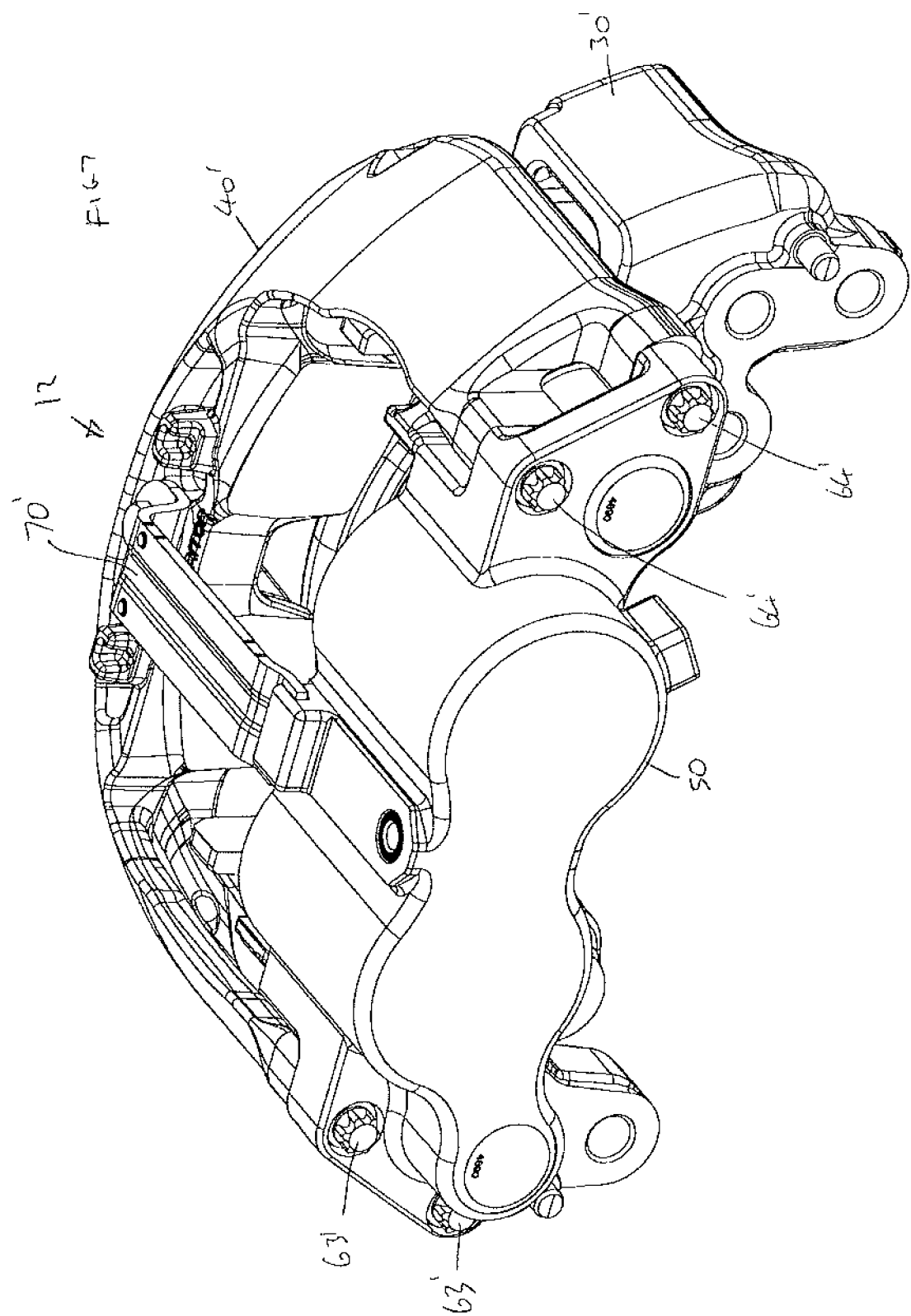
FIG. 7 is an isometric view of a hydraulically operated brake assembly according to the present invention.
Figure 8:
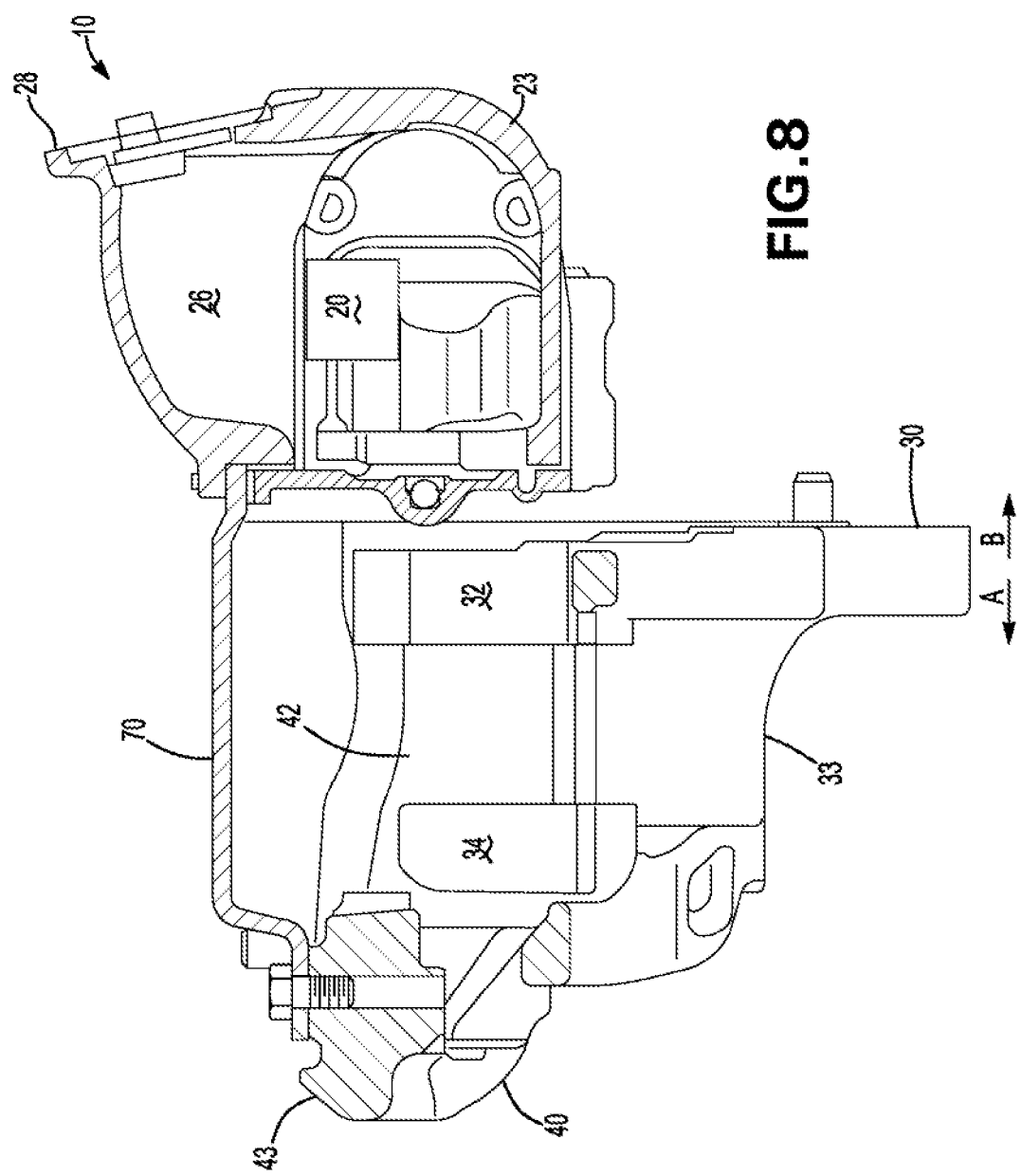
FIG. 8 is a cross section view of FIG. 4.

As shown in FIGS. 4 and 8 the solely air operated actuator 20 is housed within housing 23. As shown in FIG. 7 the solely hydraulically operated actuator 50 is used in place of the air operated actuator 20 and housing 23. In further embodiments the housing 23 may include a hydraulically operated actuator instead of an air operated actuator. Such an arrangement would provide for further economies of scale since the hydraulically operated actuator contained within housing 23 would not require slide pin holes 55, the first attachment holes 51, or the second attachment holes 52, since these features would already be provided on the housing 23 as the slide pin holes 25, first attachment holes 21 and second attachment holes 22 respectively. Thus, the housing 23 may be suitable for receiving the air operated brake actuator 20 and may also be suitable for receiving a hydraulically operated brake actuator (not shown). If it is decided to make an air operated brake assembly then an air operated brake actuator will be assembled into the housing 23, and if it is desired to make a hydraulically operated brake assembly, then a hydraulically operated brake actuator will be assembled into the housing 23.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of making a first brake assembly and a second brake assembly comprising:
   a) providing a first bare casting;
   b) providing a second bare casting having a same configuration as the first bare casting;
   c) providing a first housing and receiving an air operated brake actuator in the first housing;
   d) providing a second housing and receiving a hydraulically operated brake actuator in the second housing;
   e) providing a first bridge that has an attachment feature, wherein the first housing and the second housing are attachable to the attachment feature of the first bridge;
   f) providing a second bridge that has an attachment feature, wherein the first housing and the second housing are attachable to the attachment feature of the second bridge;
   g) machining the first bare casting in a first manner to produce a first brake pad carrier, the first manner being suitable for attaching the air operated actuator;
   h) machining the second bare casting in a second manner to produce a second brake pad carrier, the second manner being suitable for attaching the hydraulically operated brake actuator;
   i) attaching the first housing to the attachment feature of the first bridge and to the first brake pad carrier, thereby providing the first brake assembly; and
   j) attaching the second housing to the attachment feature of the second bridge and to the second brake pad carrier, thereby providing the second brake assembly.

2. The method of claim 1 wherein the first bridge has a body for engaging a brake pad, a first arm extending from a first end of the body, and a second arm extending from a second end of the body.

3. A method of making a brake assembly comprising:
   a) providing a brake pad carrier;
   b) providing one air operated brake actuator;
   c) providing a first housing and receiving the air operated brake actuator in the first housing;
   d) providing one hydraulically operated brake actuator;
   e) providing a second housing and receiving the hydraulically operated brake actuator in the second housing;
   f) providing a bridge for engaging a brake pad, wherein the bridge has an attachment feature, and wherein the first housing and the second housing are attachable to the attachment feature; and
   g) attaching only one of the first housing and the second housing to the brake pad carrier and to the bridge to provide the brake assembly.

4. The method of claim 3 wherein the bridge has a body for engaging a brake pad, a first arm extending from a first end of the body, and a second arm extending from a second end of the body.

5. The method of claim 3 wherein the bridge comprises a body for engaging a brake pad, a first arm extending from a first end of the body and a second arm extending from a second end of the body, and wherein the first arm, the second arm, or the first arm and the second arm includes the attachment feature.

* * * * *